United States Patent
Sacks

(10) Patent No.: US 6,490,111 B1
(45) Date of Patent: Dec. 3, 2002

(54) METHOD AND APPARATUS FOR REFRESHING SERVO PATTERNS IN A DISC DRIVE

(75) Inventor: Alexei H. Sacks, Edina, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/550,876

(22) Filed: Apr. 17, 2000

Related U.S. Application Data
(60) Provisional application No. 60/150,711, filed on Aug. 25, 1999.

(51) Int. Cl.⁷ .............................................. G11B 5/596
(52) U.S. Cl. ......................... 360/53; 360/75; 360/77.03
(58) Field of Search .............................. 360/53, 25, 31, 360/54, 77.03, 78.11, 75; 369/13–14

(56) References Cited

U.S. PATENT DOCUMENTS

| | | | |
|---|---|---|---|
| 4,679,103 A | 7/1987 | Workman | 360/77 |
| 4,954,907 A | 9/1990 | Takita | 360/78.07 |
| 5,089,757 A | 2/1992 | Wilson | 318/560 |
| 5,117,408 A | 5/1992 | Weispfenning et al. | 369/32 |
| 5,136,439 A | 8/1992 | Weispfenning et al. | 360/77.08 |
| 5,138,511 A | 8/1992 | Hoshimi et al. | 360/135 |
| 5,345,342 A | 9/1994 | Abbot et al. | 360/48 |
| 5,504,639 A | 4/1996 | Kawazoe | 360/103 |
| 5,576,906 A | 11/1996 | Fisher et al. | 360/77.08 |
| 5,585,989 A | 12/1996 | Kuromiya et al. | 360/135 |
| 5,602,692 A | 2/1997 | Freitas et al. | 360/77.08 |
| 5,677,819 A | 10/1997 | Seko et al. | 360/135 |
| 5,680,267 A | 10/1997 | Tanaka et al. | 360/51 |
| 5,825,579 A | 10/1998 | Cheung et al. | 360/77.08 |
| 5,858,474 A * | 1/1999 | Meyer et al. | 427/130 |
| 5,867,341 A | 2/1999 | Volz et al. | 360/77.08 |
| 5,875,064 A * | 2/1999 | Chainer et al. | 360/75 |
| 5,875,083 A | 2/1999 | Oniki et al. | 360/135 |
| 6,064,541 A * | 5/2000 | Sasamoto et al. | 360/77.05 |
| 6,344,942 B1 * | 2/2002 | Yarmchuk | 360/75 |

FOREIGN PATENT DOCUMENTS

| | | |
|---|---|---|
| EP | 0 262 690 | 4/1988 |
| EP | 0 420 439 | 4/1991 |
| EP | 0 789 704 | 3/1997 |
| WO | WO 97/28529 | 8/1997 |

* cited by examiner

Primary Examiner—David Hudspeth
Assistant Examiner—Varsha A. Kapadia
(74) Attorney, Agent, or Firm—Westman, Champlin & Kelly

(57) ABSTRACT

A method of refreshing magnetization of a servo pattern in a magnetic medium within a disc drive is provided, wherein the servo pattern is at least partially defined by physical features of the medium. The method includes reading servo information through a transducer in the disc drive from a first portion of the servo pattern. The transducer is positioned at a radial position relative to the medium based on the servo information. The magnetization of a second portion of the servo pattern is then refreshed at the radial position with a magnetic field generated by the transducer.

16 Claims, 5 Drawing Sheets

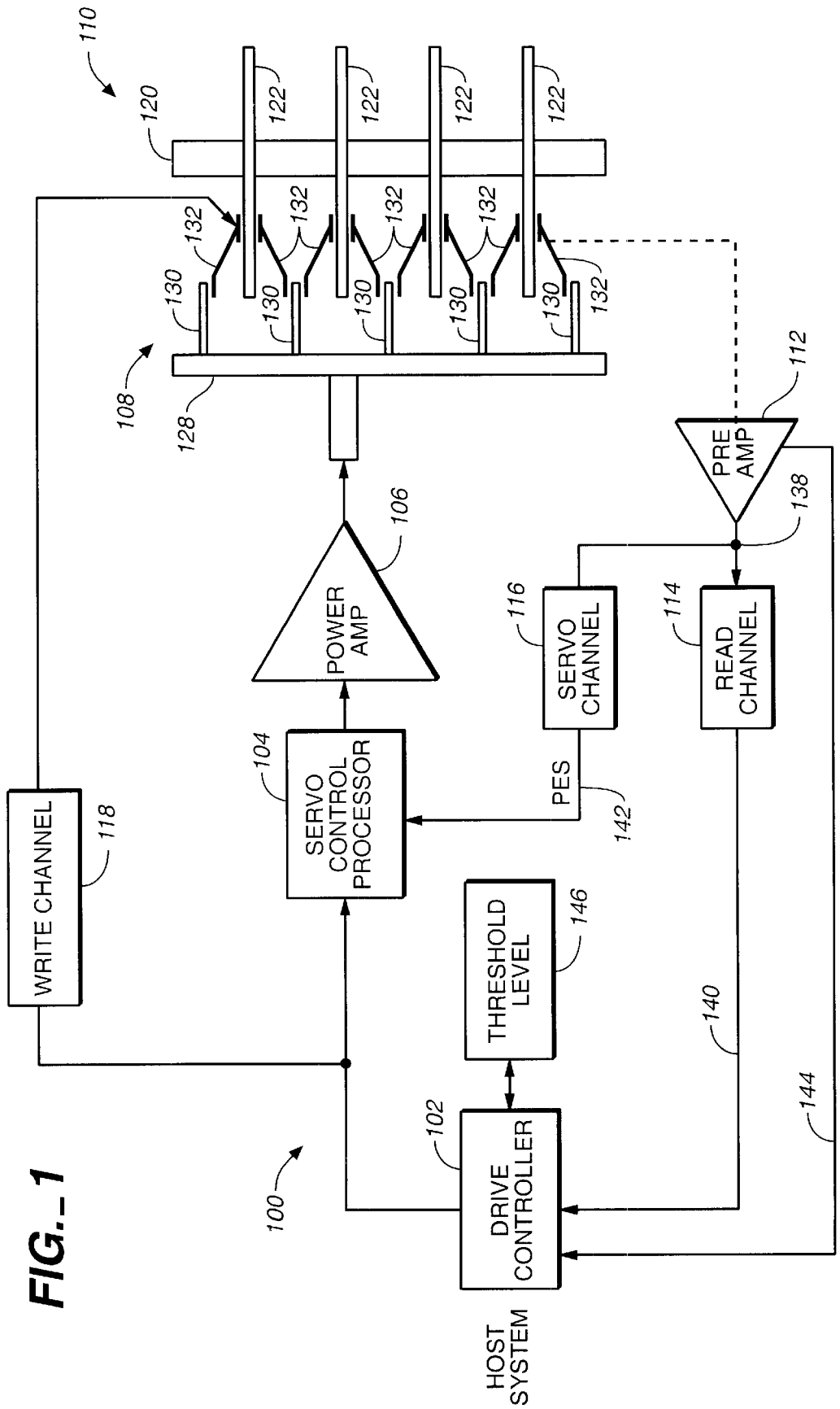
FIG._1

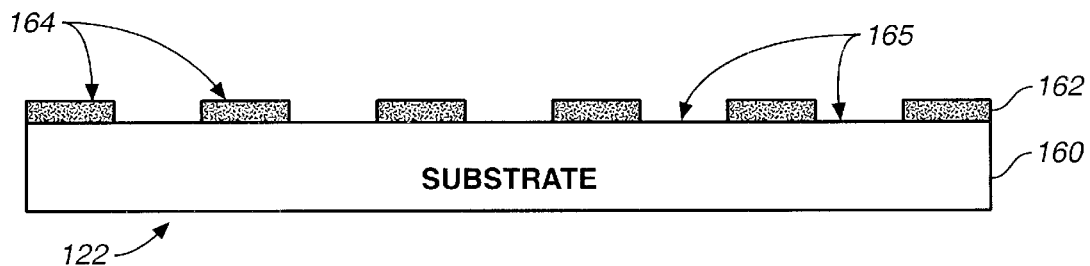
FIG._2
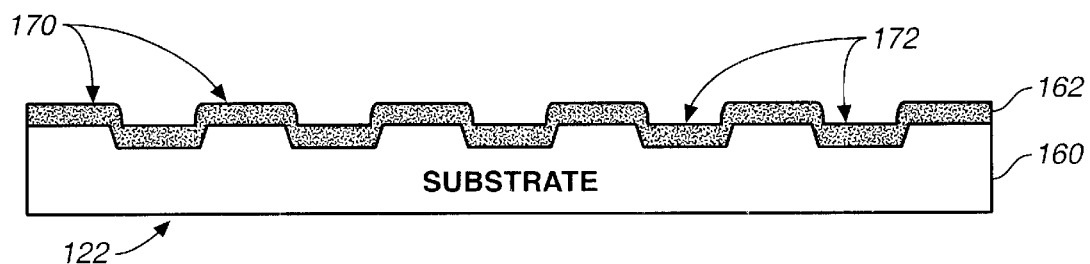
FIG._3
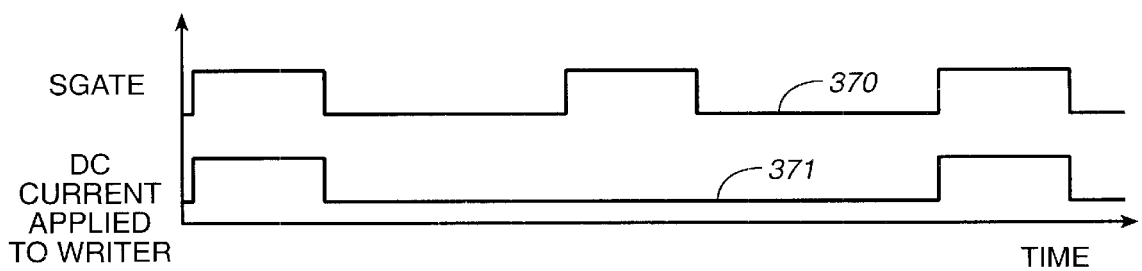
FIG._8

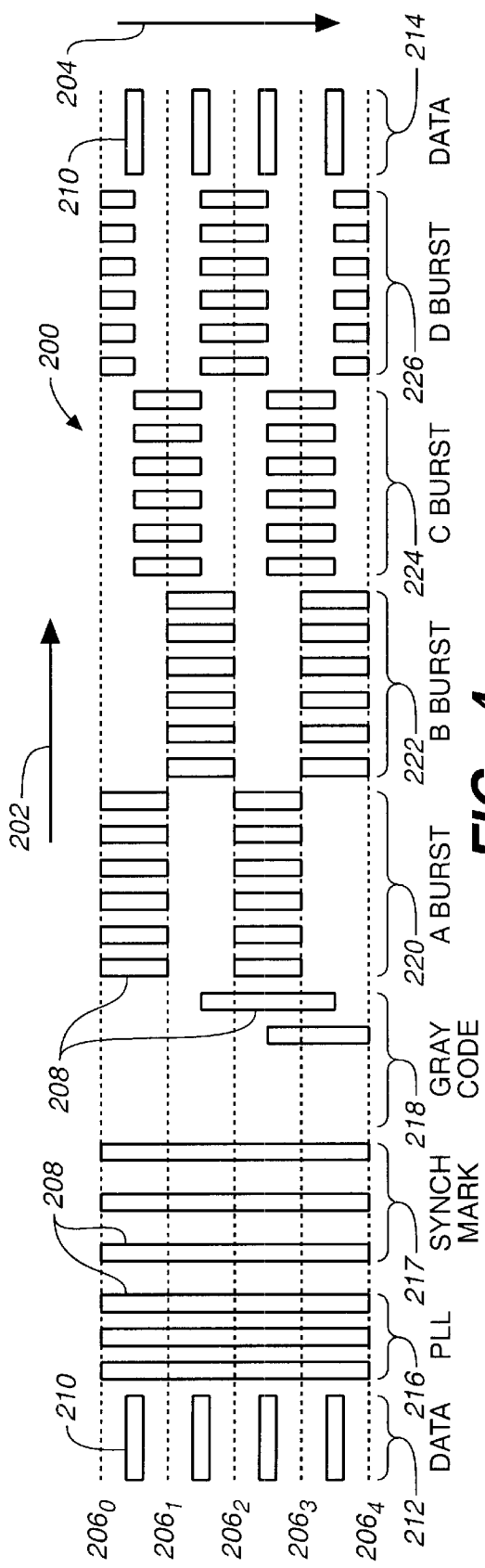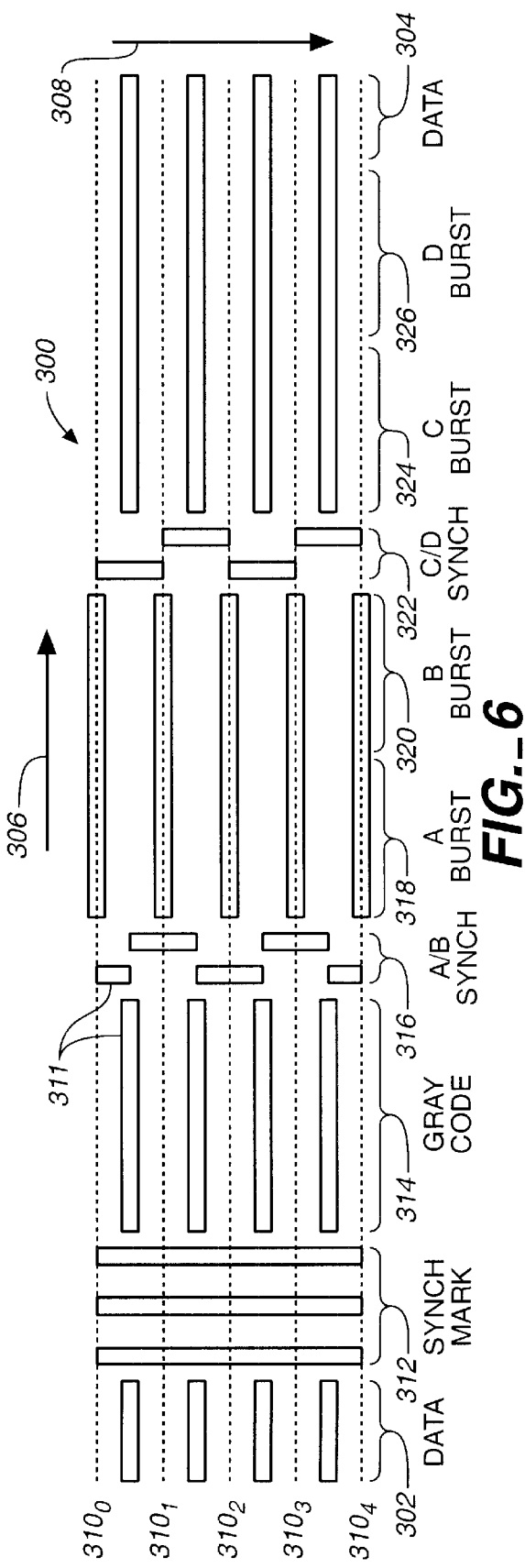

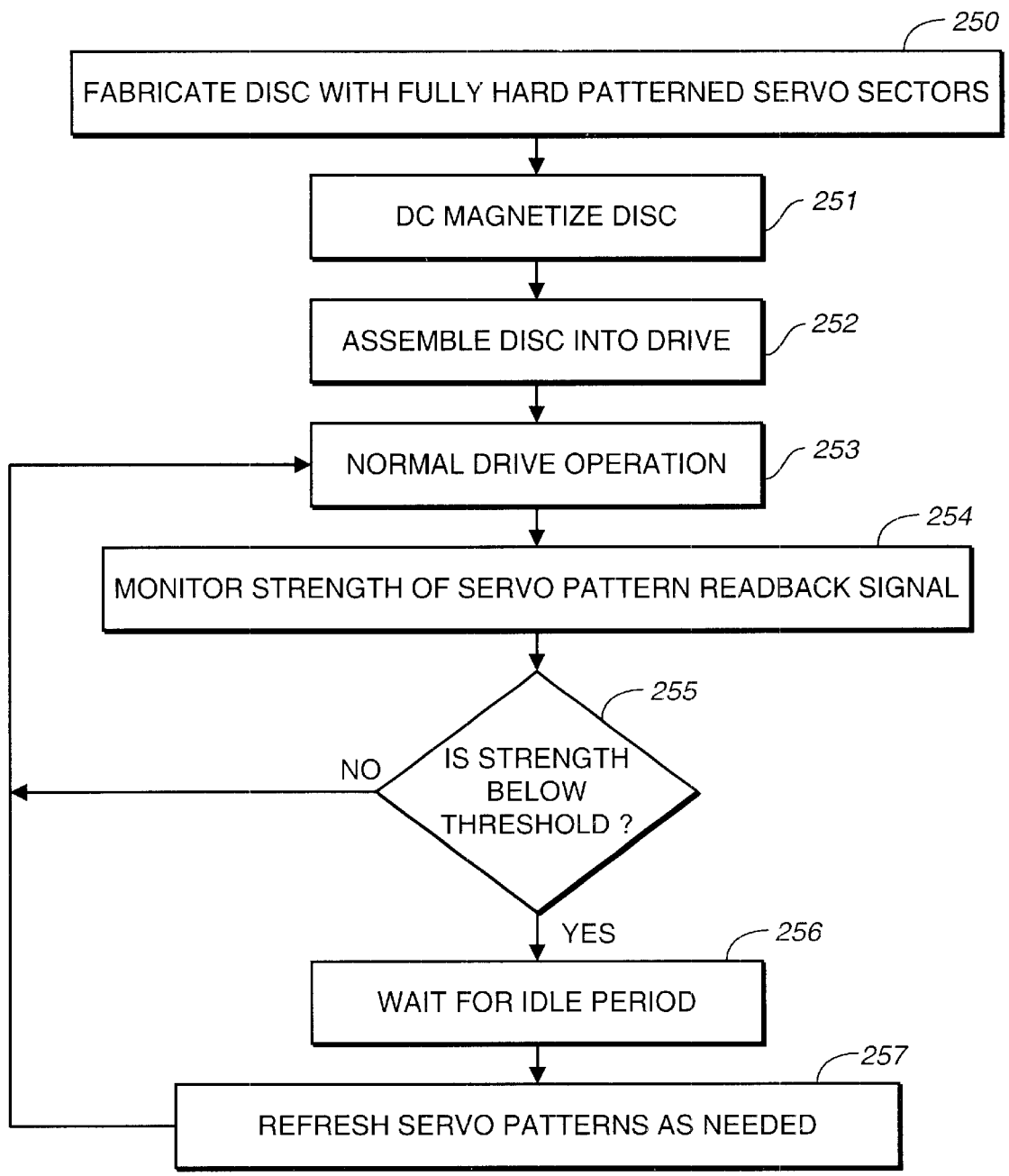
FIG._5

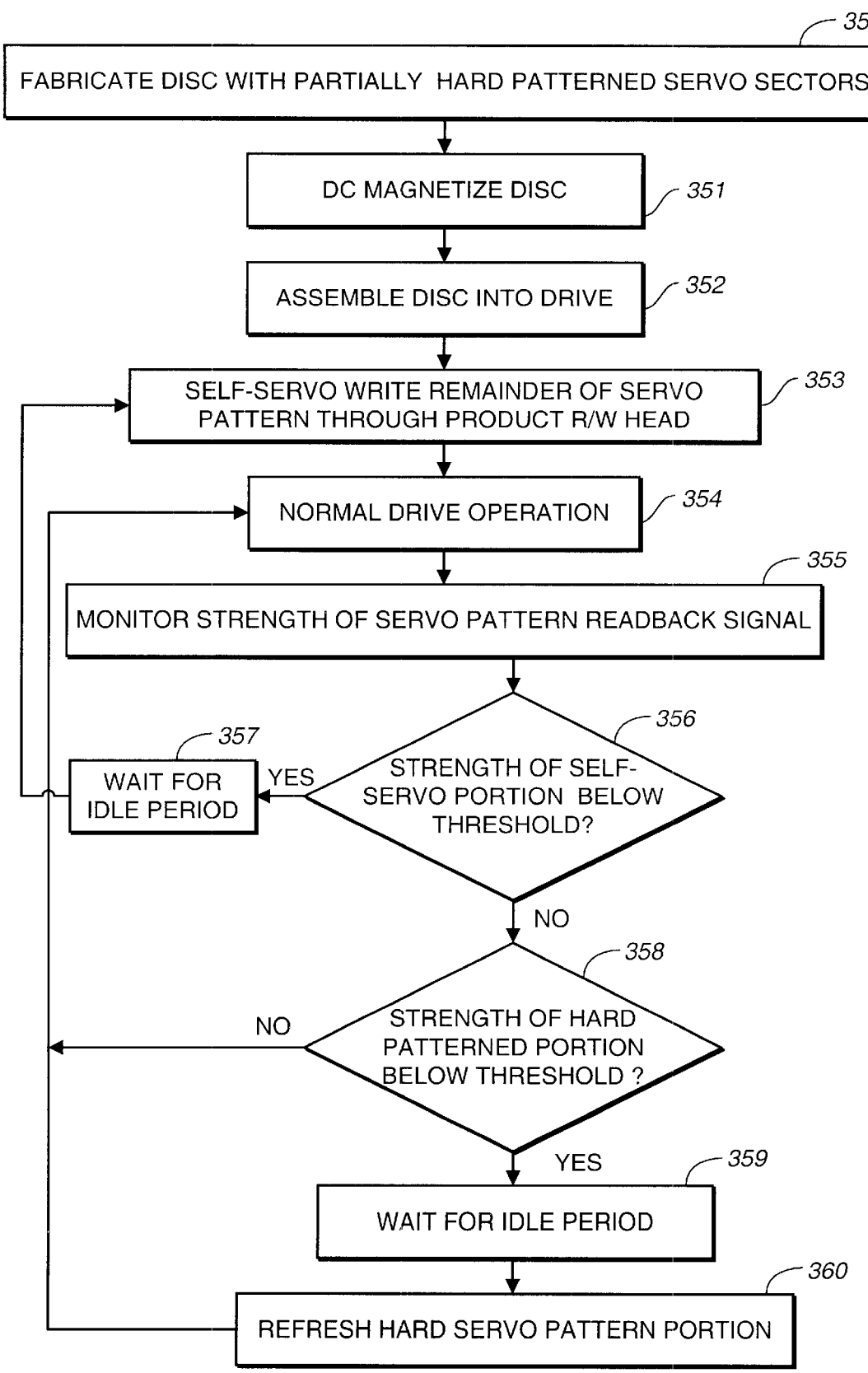
FIG._7

METHOD AND APPARATUS FOR REFRESHING SERVO PATTERNS IN A DISC DRIVE

CROSS-REFERENCE TO RELATED APPLICATION

This application claims the benefit of U.S. Provisional Application No. 60/150,711, entitled "METHOD OF REFRESHING SERVO PATTERN IN SERVO PATTERNED MEDIA," filed Aug. 25, 1999.

BACKGROUND OF THE INVENTION

The present invention relates to data storage devices and, in particular, to servo patterns on magnetic media within data storage devices.

In a magnetic disc drive, data is stored on one or more discs, which are coated with a magnetic medium. The magnetic medium is typically divided into a plurality of parallel data tracks, which are arranged concentrically with one another perpendicular to the disc radius.

The data is stored and retrieved by a transducer or "head" that is positioned over a desired track by an actuator arm. The actuator arm moves the head in a radial direction across the data tracks under control of a closed-loop servo system based on position information or "servo data", which is stored within dedicated servo fields. The servo fields can be interleaved with data sectors on the disc surface or can be located on a separate disc surface that is dedicated to storing servo information. As the head passes over the servo fields, it generates a read back signal that identifies the location of the head relative to the center line of the desired track. Based on this location, the servo system moves the actuator arm to adjust the head's position so that it moves toward a desired position.

The servo field patterns are typically written onto the disc surface through the product read/write head after the disc has been assembled within the disc drive housing to form a head disc assembly (HDA). A machine called a Servo Track Writer (STW) clamps the HDA along the X, Y and Z axes and then through some method, measures the position of the read/write head and positions the head to the appropriate radial locations to write the servo tracks. Typical methods of obtaining position feedback include the use of a laser interferometer or an optical encoder.

The servo track writer also provides a clock signal with which to align adjacent servo tracks in time. Typically, a clock head is inserted into the HDA and is flown on one of the disc surfaces. The clock head is used to write a clock signal onto the disc surface. This clock signal is then used to run a phased locked loop (PLL) for obtaining a stable reference signal with which to write adjacent radial tracks in a servo pattern with sufficient radial coherence.

In self-servo track writer systems, the servo tracks are written by bootstrapping the position of each track by the position of the previous track in the HDA with no external references. In these systems, errors in the placement of the servo tracks tend to propagate radially from one track to the next as each track is written in the HDA.

As the storage density of disc drives continues to increase, thermal decay of the individual magnetic domains in the servo fields is becoming a greater concern. This thermal decay is due to a "superparamagnetic" effect in which individual grains of the magnetic medium within a magnetic domain can spontaneously reverse polarity This causes a degradation in the quality of the read back signal that is produced by the magnetic domain. As the quality of the servo patterns decays, it becomes more difficult for the closed-loop servo control system to generate accurately the reference position signals with which the disc drive finds user data on the disc surface. As a result, some user data can be lost.

One approach that has been proposed to reduce the effects of thermal decay is the use of hard servo patterned media. Hard servo patterned media refers to producing physical features in or on the recording disc that cause the read back transducer to produce a signal that can be used to generate a position error signal (PES) with respect to the center line of the desired data track. Multiple approaches to fabricating servo patterned media have been proposed, which produce multiple classes of servo patterned media.

There are two main methods of producing hard servo patterned media. In the first method, the magnetic disc is fabricated using currently known methods, minus the carbon overcoat and lube. Then, portions of the magnetic medium are etched away to define the servo patterns and other features. The etched magnetic medium is then protected by a layer of carbon, and the lube is applied in the final fabrication step. The pattern of transitions between magnetic and non-magnetic media are used to define the servo patterns. This type of patterning technique may be less susceptible to the superparamagnetic effect if one dibit is formed from one etched island such that the magnetic material of adjacent dibits are physically isolated from one another. This may limit magnetic interaction between the grains of adjacent di-bits.

In the second method, the substrate surface is patterned to form a topography that defines the desired servo pattern features. The magnetic medium is then deposited on top of the featured substrate. Spacing loss between the head and the medium surface due to the substrate topography produces a read back signal that can be used to generate a position error signal (PES). However, because of the continuous magnetic medium film between the raised islands and recessed valleys along the topography, it is not currently clear that thermal decay will not occur if the raised islands are used to define the servo dibits.

The present invention addresses these and other problems, and offers other advantages over the prior art.

SUMMARY OF THE INVENTION

One aspect of the present invention is directed to a method of refreshing magnetization of a servo pattern in a magnetic medium within a disc drive, wherein the servo pattern is at least partially defined by physical features of the medium. The method includes reading servo information through a transducer in the disc drive from a first portion of the servo pattern. The transducer is positioned at a radial position relative to the medium based on the servo information. The magnetization of a second portion of the servo pattern is then refreshed at the radial position with a magnetic field generated by the transducer.

Another aspect of the present invention relates to a method of maintaining magnetization of a servo pattern in a disc drive. The method includes operating the disc drive in a normal operating mode in which user data areas within the magnetic medium are accessed by reading servo information from a first portion of the servo pattern through a transducer in the disc drive and positioning the transducer at a desired radial position relative to the medium based on the servo information. The disc drive is then operated in a refresh mode in which the first portion of the servo pattern is re-magnetized with a magnetic field generated by the transducer. The disc drive is returned to the normal operating mode after operating in the refresh mode.

In one embodiment, a representation of a magnetic field strength produced by the magnetic medium within the first portion of the servo pattern is measured while in the normal operating mode. If the representation of the magnetic field strength is less than a threshold level, the disc drive is switched from the normal operating mode to the refresh mode.

Yet another aspect of the present invention is directed to a disc drive, which includes a data storage disc and a transducer. The data storage disc includes a magnetic medium having a servo area and a user data area. The servo area is defined by a set of magnetic domains having a magnetization pattern, wherein at least some of the magnetic domains are defined by physical features of the medium. The transducer is adapted to generate a read signal in response to magnetic transitions within the servo area and the user data area and is adapted to generate a write signal in the form of a magnetic field. The disc drive further includes an apparatus for refreshing the magnetization pattern of the set of magnetic domains with the magnetic field generated by the transducer.

BRIEF DESCRIPTION OF THE DRAWINGS

FIG. 1 is a simplified block diagram of a disc drive according to one embodiment of the present invention.

FIG. 2 is a cross-sectional view of a disc having a servo pattern directly etched into the media, according to one embodiment of the present invention.

FIG. 3 is a cross-sectional view of a disc having a servo pattern formed into the surface of the substrate, according to an alternative embodiment of the present invention.

FIG. 4 is a diagram of a split-burst type servo sector, which has been fully patterned within a magnetic medium film of a disc, according to one embodiment of the present invention.

FIG. 5 is a flow chart illustrating a process for defining and refreshing magnetization patterns in a servo sector for fully servo patterned media, according to one embodiment of the present invention.

FIG. 6 is a diagram, which illustrates a servo sector that is hard patterned in or on the media according to an alternative embodiment of the present invention.

FIG. 7 is a flow chart, which illustrates a process for writing and maintaining an assisted self-STW servo pattern onto one of the discs shown in FIG. 1.

FIG. 8 is a timing diagram, which illustrates a sequence for refreshing hard patterned portions of a servo sector according to one embodiment of the present invention.

DETAILED DESCRIPTION OF ILLUSTRATIVE EMBODIMENTS

The present invention is directed to a method and apparatus for refreshing servo patterns in magnetic disc drives having hard servo patterned media. Periodically refreshing the servo patterns during operation of the disc drive overcomes the effects of servo pattern degradation due to thermal decay of the medium magnetization.

FIG. 1 is a simplified block diagram of a disc drive 100, which includes drive controller 102, servo control processor 104, power amplifier 106, actuator assembly 108, disc pack 110, one or more preamplifiers 112, read channel 114, servo channel 116 and write channel 118. Disc pack 110 includes spindle 120, which supports one or more coaxially arranged discs 122. Although four discs 122 are shown in FIG. 1, disc pack 110 can include any number of discs. Each disc 122 has first and second recording surfaces with concentric data tracks for storing user data in the form of magnetic flux reversals, which are encoded in the tracks. Actuator assembly 108 includes a base 128, which supports one or more track accessing arms 130. Each track accessing arm 130 is coupled to at least one suspension 132, which supports a recording head, such as a read and write head, for accessing data on a corresponding disc surface.

Drive controller 102 is typically a microprocessor or digital computer, and is coupled to a host system or another drive controller, which controls a plurality of drives. During a write operation, drive controller 102 receives a command signal from the host system, Which indicates that data is to be written on a certain portion of one or more of discs 122. In response to the command signal, drive controller 102 provides servo control processor 104 with a position request signal, which indicates a particular track or cylinder over which actuator assembly 108 is to position suspensions 132 and their associated write heads. Servo control processor 104 converts the position request signal to an analog signal such as a current which is amplified by power amplifier 106 and is provided to actuator assembly 108. In response to the analog position signal, actuator assembly 108 radially positions suspensions 132 and their associated write heads over the desired track.

Drive controller 102 provides the user data that is to be stored to write channel 118. Write channel 118 encodes the data according to a selected encoding scheme and then writes the encoded data in the desired track by controlling the direction of current flowing through the appropriate write head or heads.

During a read operation, drive controller 102 receives a command signal from the host system, which indicates that a certain portion of one or more of discs 122 is to be accessed. In response to the command signal, drive controller 102 provides servo control processor 104 with a position request signal, which indicates the track to be accessed. Again, servo control processor 104 controls the position of suspensions 132 and their associated read heads through amplifier 106 in response to the position request signal.

As the read head passes over the disc surface within the desired track, the magnetization patterns within the track generate a read signal in the read head, which contains the encoded data that was written on the disc surface. The read signal is provided to preamplifier 112, which amplifies the read signal and provides it to read channel 114 and servo channel 116. In an embedded servo scheme, servo sectors are interleaved with user data sectors on the surfaces of discs 122. When a read head passes over a data sector, read channel 114 decodes the encoded data from the read signal to recover the original user data, and then passes the recovered user data to drive controller 102 through data output 140.

When the read head passes over a servo sector, the magnetization patterns within the servo sector generate a plurality of servo bursts in the read signal, which provide an indication of the position of the read head within the desired track on the disc surface. Servo channel 116 demodulates the servo bursts to determine the current location of the head and generates a position error signal (PES) estimate on PES output 142, which indicates a magnitude and direction of the position error. Servo control processor 104 monitors the.

PES and, based on the current location of the head and the desired location received from drive controller 102, servo control processor adjusts the current applied to actuator assembly 108.

In addition, drive controller 102 monitors the amplitude (or other measure of signal quality) of the servo bursts to determine whether thermal decay of the servo patterns has caused the amplitude of the servo bursts to drop below a preset threshold level 146. In one embodiment, preamplifier 112 provides drive controller 102 with a measure of the amplitude of the servo bursts over line 144. For example, preamplifier 112 can be implemented within a Marvell 4200 channel chip having an automatic gain control (AGC) register. The output of the AGC register can be provided to drive controller 102 over line 144 as a measure of the strength of the magnetic field generated by the servo patterns. In an alternative embodiment (not shown), the read back signal is applied to one input of a comparator, and another input of the comparator is coupled to threshold level 146. The comparison can be performed in either the analog or digital domains. The output of the comparator is provided to drive controller 102. Other signal quality measurement circuits can also be used.

When the signal quality of the servo bursts falls below threshold level 146, drive controller switches from the normal operating mode to a servo pattern refresh mode in which write channel 118 and servo control processor 104 are used to refresh the magnetization patterns of the servo sectors on discs 122. In an alternative embodiment, the drive controller 102 refreshes the servo patterns on a preset periodic basis. In order to avoid interference with normal drive operation, drive controller 102 may wait until an idle period before switching to the refresh mode. The servo patterns can be refreshed all at one time or portions of the servo pattern can be refreshed as needed.

FIG. 2 is a cross-sectional view of one of the discs 122 in which the servo pattern is directly etched into the media, according to one embodiment of the present invention. Disc 122 includes a standard smooth substrate 160 and a magnetic medium film 162. During fabrication, magnetic medium film 162 is deposited on substrate 160 and a photoresist is applied to film 162 and developed to expose areas on film 162 in the form of the desired servo pattern. The exposed areas on film 162 are etched to define the desired servo patterns within film 162. Islands 164 correspond to magnetic areas of medium 162, and pits or grooves 165 correspond to non-magnetic areas of medium 162. The etched film 162 is then protected by a layer of carbon, and a lubrication is applied in the final fabrication step. In one embodiment, each magnetic domain that forms a di-bit in the servo readback signal is defined by one of the etched islands 164 in magnetic medium film 162. This may reduce the superparamagnetic effect since individual magnetic domains are physically isolated from one another.

During operation, as the magnetic read head passes over the servo patterns defined by the physical features of film 162, the magnetic read head produces readback pulses at the transitions between magnetic and non-magnetic regions of film 162. These readback pulses can be used to create a position error signal if the servo pattern is correctly designed. Several types of servo patterns can be used, such as "null-type", a "split-burst amplitude type" and a "phase-type" servo patterns. Other servo patterns can also be used.

FIG. 3 is a cross-sectional view of one of the discs 122 according to an alternative embodiment of the present invention. The same reference numerals are used in FIG. 3 as were used in FIG. 2 for the same or similar elements. In this embodiment, the surface 166 of substrate 160 is patterned to form a topography that can be used to define the servo patterns. The topography can be formed by etching substrate 160 or by any other patterning technique. The magnetic medium film 162 is then put down on top of the patterned substrate 160. This creates raised islands 170 and recessed valleys 172 in magnetic medium film 162, which are subsequently magnetized in opposite directions. As the magnetic read head passes over the patterned areas of disc 122, the transitions in magnetic orientation produce magnetic readback pulses in the head, which can be used to create a position error signal. In an alternative embodiment, islands 170 and valleys 172 are magnetized in the same direction, and spacing loss at the magnetic read gap from the magnetic read head to media film 162 in the valleys 172 causes a magnetic readback pulse in the head, which can be used to create a position error signal. For the type of servo patterning method shown in FIG. 3, it is not currently clear whether thermal decay will occur if isolated islands 170 are used to define the servo di-bits because of the continuous nature of magnetic medium film 162. For this type of patterning technique, the magnetization of these di-bits may need refreshing during disc drive operation.

FIG. 4 is a diagram of a split-burst type servo sector 200, which has been fully patterned within a magnetic medium film on one of the discs 122, according to one embodiment of the present invention. This patterning can be formed by either of the techniques shown in FIGS. 2 and 3, for example. Arrow 202 indicates a down-track or angular dimension of the disc surface, and arrow 204 indicates a cross-track or radial dimension of the disc surface. FIG. 2 shows five track centers labeled $206_0$–$206_4$, respectively. However, any number of tracks can be used within servo sector 200.

The rectangular regions 208 in FIG. 4 correspond to pits. These regions correspond to non-magnetic portions (or recessed portions in the case of a featured substrate) of the magnetic medium film, and the surrounding regions would correspond to magnetic portions (or raised portions) of the magnetic medium film. In the factory, the surrounding regions would be magnetized with a common magnetic orientation by applying an external magnetic field to the disc surface. For example, in a longitudinal recording system, the surrounding regions may have a magnetic orientation that is left-to-right or right-to-left in the figure. The horizontal rectangles 210 in FIG. 4 indicate either grooves or non-magnetic portions of the magnetic medium film, which are used to provide radial definition to user data within data fields 212 and 214 that are adjacent to servo sector 200.

Servo sector 200 includes phase-locked loop (PLL) field 216, sync field 217, track ID Gray code field 218, and a series of position error (PES) fields, which include A burst field 220, B burst field 222, C burst 20 field 224 and D burst field 226. PLL field 216 and sync field 217 contain radially coherent magnetic transitions. When the read/write head (not shown) passes over fields 216 and 217, the magnetization patterns within these fields induce an oscillating readback signal. The oscillating readback signal is used to lock the phase and frequency of the disc drive read channel to the phase and frequency of the readback signal. Track ID Gray code field 218 contains information identifying the particular track over which the head is located.

PES burst fields 220, 222, 224 and 226 are used to identify the location of the head with respect to the track center line. In the embodiments shown in FIG. 4, these PES burst fields include a split-burst amplitude magnetization pattern that is defined by the physical features of the magnetic medium as described with reference to FIGS. 2 and 3 above. The PES burst fields 220, 222, 224 and 226 are positioned in a predetermined phase relation to the patterns in fields 216 and 217. As the read/write head passes over PES burst fields 220, 222, 224 and 226, the readback signal generated in the head is demodulated to produce a position error value. At the track center, the position error value will have a zero magnitude while the head passes over burst fields 220 and 222. If the head is positioned to one side of the track center, the position error value will be positive and have a magnitude indicating the amount of displacement. If the head is positioned to the other side of the track center, the position error value will be negative and have a magnitude indicating the amount of displacement. Other types of servo patterns can be used, such as a null-type servo pattern.

The smallest unit of the servo pattern is one of the small rectangles in PES burst fields 220, 222, 224 and 226. When the read/write head passes over one of these regions that are bounded by magnetic (or oppositely polarized) portions of the medium, a di-bit results in the readback signal due to the discontinuity of the medium. This surrounding magnetic medium is susceptible to the superparamagnetic effect, where individual grains may begin to reverse magnetic polarity over time. This is known as thermal decay and can result in a reduction in the quality of the readback signal produced by servo sector 200. According to the present invention, these magnetic domains are refreshed periodically or as needed during operation of the disc drive in order maintain accurate positioning of the read/write head.

FIG. 5 is a flow chart illustrating a process for defining the magnetization patterns in a servo sector for fully servo patterned media, according to one embodiment of the present invention. At step 250, the disc is fabricated with hard patterned servo sectors that are fully defined by the physical features of the medium, according to patterning techniques such as those shown in FIGS. 2 and 3. Once the disc has been fabricated, the magnetic medium is initially DC magnetized, at step 252. DC magnetization is typically performed with a strong external magnetic field. For example, in a longitudinal recording system, the entire disc is circumferentially "DC" magnetized in a uniform longitudinal direction.

If the media is patterned with the technique shown in FIG. 2, then only a single DC magnetization step is needed. If the substrate is patterned with the technique shown in FIG. 3, a first DC magnetization step would be performed with the external magnetic field having a field strength that is sufficient to magnetize both islands 170 and valleys 172 of medium 162. Then a second DC magnetization step would be performed with the magnetic field being reversed and having lower field strength that is sufficient to magnetize islands 170, but not valleys 172, in the reverse direction.

Once the disc has been DC magnetized, the disc is assembled into the drive, at step 252. In an alternative embodiment, the DC magnitization is performed within the drive through the product write head with a slow seek of the actuator. The drive can then begin normal drive operation, at step 253. During normal drive operation, the drive controller monitors the strength of the servo bursts in the read back signal produced by the magnetic domains of each servo sector, at step 254. At step 255, if the signal strength is not below a preset threshold level, then the drive continues in the normal operating mode, at step 253. If the signal strength is below the threshold level, the drive controller waits for an idle period in the normal disc drive operation, at step 256, and then operates the drive in a servo pattern refresh mode, at step 257, where the servo patterns are refreshed as needed. If the disc drive is a low performance version, the drive controller may not have to wait for an idle period, at step 256, in order to begin refreshing the servo patterns.

Since it is not currently possible to read from the head while writing, consecutive servo sectors are not written consecutively in one embodiment of the present invention. The drive servo system will be unable to function properly if it misses multiple servo sectors in a row. Therefore, one possible method of refreshing the servo patterns is to read every other servo sector to generate a position error signal from which the head is positioned over the desired track, and to apply a DC write current to the head during the alternate servo sectors to refresh the servo patterns within those sectors. The servo sectors that were used to generate a position error signal can then be re-written or reinforced in subsequent passes. Also, several passes may be required to write all of the burst fields within a given servo sector, with the head being repositioned with each subsequent pass of the head.

FIG. 6 is a diagram, which illustrates a servo sector 300 that is hard patterned in or on the media according to an alternative embodiment of the present invention. In FIG. 6, only a minimum number of servo features are hard patterned on the disc, and the remaining portions of the servo pattern are filled-in by writing the desired servo pattern signals with the magnetic write element in the disc drive. This is known as an assisted self-servo track write (STW) patterned media format.

Servo sector 300 is positioned between data areas 302 and 304. Arrow 306 indicates a down-track or angular dimension of the disc is surface, and arrow 308 indicates a cross-track or radial dimension of the disc surface. FIG. 6 shows five track centers labeled $310_0$–$310_4$. The rectangles 311 in servo pattern 300 correspond to pits or grooves formed into the media or alternatively, the substrate. In the case where the servo patterns are formed by etching the media, these pits or grooves correspond to non-magnetic regions of the media. In the case where the servo patterns are formed by patterning the substrate, the pits or grooves correspond to recessed portions of the media, such as valleys 172 shown in FIG. 3. The horizontal rectangles in servo sector 300 and user data areas 302 and 304 provide radial definition and a radial constraint for standard magnetically written transitions between the rectangles.

Servo sector 300 includes sync field 312, track ID Gray code-field 314, A/B burst sync field 316, A burst field 318, B burst field 320, C/D sync field 322, C burst field 324 and D burst field 326. Sync field 312 is used to synchronize the writing of track ID Gray code field 314 through the write head in the disc drive. The A/B and C/D sync fields are used to provide coarse PES positioning for writing the magnetic domains through the read/write head in A, B, C and D burst fields, 318, 320, 324 and 326. These magnetic domains can have a similar pattern as that shown in FIG. 4, wherein the regions would correspond to regions of opposite magnetic polarity as compared to the surrounding regions.

FIG. 7 is a flow chart, which illustrates a process for writing and maintaining an assisted self-STW servo pattern onto one of the discs 122 (shown in FIG. 1). At step 350, the disc is fabricated with partially patterned servo sectors as described with reference to FIGS. 2, 3 and 6, for example. At step 351, the disc is "DC" magnetized with a uniform magnetization pattern such as right-to-left or left-to-right in FIG. 6 for longitudinal magnetization, as discussed above with reference to FIG. 5. In a perpendicular recording system, the disc is DC magnetized into or out of the page in FIG. 6. Once the disc has been magnetized, the disc is assembled into the drive, at step 352.

The remainder of the servo pattern is then self-servo written through the product read/write head within the factory, at step 353. Sync field 312 (shown in FIG. 6) is used to synchronize the temporal location of each magnetic domain written by the product read/write head within fields 314, 318, 320, 324 and 326, while fields 316 and 322 are used to provide coarse radial positioning. Also, the rectangular grooves within each servo sector provide radial accuracy for each of the magnetic domains.

At step 354, the drive enters normal drive operation. During normal drive operation, the drive controller monitors the strength of the readback signals produced by the hard patterned portions and the self-servo written portions of each servo sector. At step 356, if the strength of the self-servo written portion of a servo sector is below the preset threshold, the drive controller waits for an idle period, at step 357, and then returns to the self-servo writing mode, at step 353. At step 353, the magnetization patterns within the self-servo written portions of the servo field are refreshed through the product read/write head.

At step 358, if the magnetic field strength of the hard patterned portion of a servo sector is not below the preset threshold, then the drive controller continues with normal drive operation at step 354. If so, the drive controller waits for an idle period, at step 359, and then refreshes the hard servo pattern portions of each servo sectors as needed, at step 350. As described with reference to FIG. 5, the hard servo patterned portions of each servo sector can be written by applying a DC write current to the head as the head passes over these regions of the servo sector. The preset threshold is set so that there is sufficient time to carry out the refresh operations of steps 353 and 360 before a read or write failure occurs. In one embodiment, the servo patterns (either self-servo written or hard patterned) are refreshed in alternating servo sectors by generating a position error signal with one servo sector and then applying the appropriate write current to the head during the appropriate temporal locations within the next subsequent servo sector. Alternatively, if the read/write head can switch between reading and writing quickly enough, the servo sectors can be refreshed consecutively by using the coarse servo pattern marks that are patterned into (or on) the medium. When reading every other servo sector, the gains applied by the demodulation circuitry within servo channel 116 may need to be changed during this operation to account for the reduced PES sample rate. In yet another alternative embodiment, several consecutive servo sectors can be read in between each servo sector that is refreshed.

FIG. 8 is a timing diagram, which illustrates a sequence for refreshing hard patterned portions of a servo sector according to one embodiment of the present invention. Line 370 represents the logic state of a servo gate signal SGATE. The servo gate signal SGATE transitions from a logic low level to a logic high level when the product read/write head is positioned over a servo sector. Line 371 represents the DC current that is applied to the write transducer. The timing diagram is ideal in that the rise in DC current represented by line 371 would actually occur slightly inside the transitions of the SGATE signal. As shown in FIG. 8, a DC current is applied to the write transducer during every other servo sector for refreshing the magnetization orientation of the hard patterned magnetic domains within those sectors.

In summary, one aspect of the present invention is directed to a method of refreshing magnetization of a servo pattern in a magnetic 25 medium 162 within a disc drive 100, wherein the servo pattern is at least partially defined by physical features 164, 165, 170, 172 of the medium 162. The servo pattern is formed by one or more individual servo sectors 200, 300. The method includes reading servo information through a transducer 132 in the disc drive 100 from a first portion of the servo pattern. The transducer 132 is positioned at a radial position relative to the medium 162 based on the servo information. The magnetization of a second portion of the servo pattern is then refreshed at the radial position with a magnetic field generated by the transducer 132.

In one embodiment, the servo pattern comprises a plurality of servo sectors 200, 300. The servo information is read from a first of the servo sectors, and then the magnetization is refreshed within a second of the servo sectors, which is the next subsequent servo sector from the first servo sector. The disc drive 100 alternates between reading and refreshing with each consecutive one of the plurality of servo sectors 200, 300 along the magnetic medium 162.

Another aspect of the present invention relates to a method of maintaining magnetization of a servo pattern 200, 300 in a disc drive 100. The method includes operating the disc drive 100 in a normal operating mode in which user data areas within the magnetic medium 162 are accessed by reading servo information from a first portion, such as a first servo sector 200, 300, of the overall servo pattern through a transducer 132 in the disc drive 100 and positioning the transducer 132 at a desired radial position relative to the medium 162 based on the servo information. The disc drive 100 is then operated in a refresh mode 257, 353, 360 in which the first portion 200, 300 of the servo pattern is re-magnetized with a magnetic field generated by the transducer 132. The disc drive is returned to the normal operating mode 253, 354 after operating in the refresh mode 257, 353, 360.

In one embodiment, a representation of a magnetic field strength produced by the magnetic medium within the first portion 200, 300 of the servo pattern is measured 254, 355 while in the normal operating mode. If the representation of the magnetic field strength is less than a threshold level 146, 255, 356, 358, the disc drive is switched from the normal operating mode 253, 354 to the refresh mode 257, 353, 360.

Yet another aspect of the present invention is directed to a disc drive 160, which includes a data storage disc 122 and a transducer 132. The data storage disc 122 includes a magnetic medium 162 having a servo area 200, 300 and a user data area 212, 214, 302, 304. The servo area 200, 300 is defined by a set of magnetic domains having a magnetization pattern, wherein at least some of the magnetic domains are defined by physical features 164, 165, 170, 172 of the medium 162. The transducer 132 is adapted to generate a read signal in response to magnetic transitions within the servo area 200, 300 and the user data area 212, 214, 302, 304 and is adapted to generate a write signal in the form of a magnetic field. The disc drive 100 further includes an apparatus 102, 104, 106, 118, 146 for refreshing the magnetization pattern of the set of magnetic domains with the magnetic field generated by the transducer 132.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. For example, individual magnetic domains or servo sectors can be refreshed in a variety of sequences according to alternative embodiments of the present invention. The particular method of refreshing magnetization can vary depending on the patterning technique used to fabricate the disc and the encoding scheme used to write each magnetic domain. In addition, a variety of methods and circuits can be used to monitor the quality of the servo bursts in alternative embodiments.

What is claimed is:

1. A method of refreshing magnetization of a servo pattern in a magnetic medium within a disc drive, the method comprising steps of:
   (a) reading servo information through a transducer in the disc drive from a first portion of the servo pattern, wherein the servo pattern is at least partially a hard servo pattern defined by physical features of the medium;
   (b) positioning the transducer at a radial position relative to the medium based on the servo information; and
   (c) refreshing the magnetization of a second portion of the servo pattern at the radial position with a magnetic field generated by the transducer, wherein the radial position is the same radial position at which the second portion of the servo pattern was originally written.

2. The method of claim 1 wherein the servo pattern comprises a plurality of servo sectors and wherein:
   the reading step (a) comprises reading the servo information from a first of the servo sectors; and
   the refreshing step (c) comprises refreshing the magnetization at the radial position within a second of the servo sectors, which is the next subsequent servo sector from the first servo sector.

3. The method of claim 2 and further comprising:
   (c) alternating between steps (a) and (b) with each consecutive one of the plurality of servo sectors along the magnetic medium.

4. The method of claim 1 and further comprising:
   (d) measuring a magnetic field strength produced by the magnetic medium within the second portion of the servo pattern through the transducer;
   (e) detecting decay of the magnetic field strength measured in step (d) over time; and
   (f) performing the refreshing step (b) if the magnetic field strength measured in step (d) is less than a threshold level.

5. The method of claim 4 wherein:
   the measuring step (d) comprises comparing an amplitude of a read signal, which is produced by the transducer in response to magnetization of the second portion of the servo pattern, with a threshold amplitude.

6. The method of claim 4 and further comprising:
   (g) after performing step (d), waiting until the disc drive is in an idle mode before performing step (e).

7. The method of claim 1 and further comprising:
   performing steps (a), (b) and (c) for the entire servo pattern at periodic time intervals.

8. The method of claim 1 and further comprising:
   (d) operating the disc drive in a normal operating mode in which user data stored on the magnetic medium is accessed through the transducer;
   (e) performing steps (a), (b) and (c) in a servo pattern refresh mode after the operating step (d); and
   (f) returning the disc drive to the normal operating mode in which the user data stored on the magnetic medium is accessed through the transducer, after performing step (e).

9. The method of claim 1 wherein the magnetic medium is formed on a smooth substrate surface and is physically patterned to form a pattern of transitions between magnetic and non-magnetic areas in the medium that define the second portion of the servo pattern, and wherein the refreshing step (c) comprises:
   (c)(1) magnetizing the magnetic areas within the second portion of the servo pattern in a uniform magnetization direction by passing a DC write current through the transducer.

10. The method of claim 1 wherein the magnetic medium is formed on a substrate having a topography, which is physically patterned that the magnetic medium has a plurality of raised islands and recessed valleys that define the second portion of the servo pattern, and wherein the refreshing step (b) comprises:
    (c)(1) applying the magnetic field to the second portion of the servo pattern with a first polarity and at a first magnetic field strength that is sufficient to magnetize the magnetic medium along the islands and valleys in a first magnetization direction; and
    (c)(2) applying the magnetic field to the second portion of the servo pattern with a second polarity and at a second, lower magnetic field strength that is sufficient to magnetize the magnetic medium along the islands, but not along the valleys, in a second magnetization direction, which is opposite to the first magnetization direction.

11. The method of claim 1 wherein the second portion of the servo pattern comprises a servo sector, which comprises a first set of magnetic domains defined by physical features of the magnetic medium and a second set of magnetic domains defined by reversals in magnetic orientation within the magnetic medium, and wherein:
    the refreshing step (b) comprises re-writing the second set of magnetic domains with the magnetic field generated by the transducer to reinforce the reversals in magnetic orientation.

12. The method of claim 11 wherein the refreshing step (b) further comprises synchronizing temporal locations of the reversals in magnetic orientation along the magnetic medium with the first set of magnetic domains in the servo sector.

13. The method of claim 1 wherein the hard servo pattern is defined a topology of the magnetic medium.

14. A method of maintaining magnetization of a servo pattern within a magnetic medium in a disc drive, the method comprising steps of:
    (a) operating the disc drive in a normal operating mode in which user data areas within the magnetic medium are accessed by reading servo information from a first portion of the servo pattern through a transducer in the disc drive and positioning the transducer at a desired radial position relative to the medium based on the servo information;
    (b) operating the disc drive in a refresh mode in which the first portion of the servo pattern is re-magnetized with a magnetic field generated by the transducer; and
    (c) returning the disc drive to the normal operating mode in step (a) after performing step (b).

15. The method of claim 14 and further comprising:
    (d) measuring a representation of a magnetic field strength produced by the magnetic medium within the first portion of the servo pattern while in the normal operating mode;

(e) detecting decay of the magnetic field strength measured in step (d) over time; and (f) switching the disc drive from the normal operating mode of step (a) to the refresh mode in step (b) if the representation of the magnetic field strength is less than a threshold level.

16. A disc drive storage device comprising:

a data storage disc comprising a magnetic medium having a servo area and a user data area, wherein the servo area is defined by a set of magnetic domains having a magnetization pattern and at least some of the magnetic domains are hard servo patterns defined by physical features of the medium;

a transducer adapted to generate a read signal in response to magnetic transitions within the servo area and the user data area and adapted to generate a write signal in the form of a magnetic field; and means for refreshing the magnetization pattern of the set of magnetic domains with the magnetic field generated by the transducer at the same radial positions as the magnetic domains were initially written.

* * * * *